United States Patent
Wilson et al.

(10) Patent No.: US 10,152,199 B2
(45) Date of Patent: Dec. 11, 2018

(54) OBJECT BASED CONTEXTUAL MENU CONTROLS

(71) Applicant: Pinterest, Inc., San Francisco, CA (US)

(72) Inventors: Jason Luke Wilson, Mill Valley, CA (US); Naveen Gavini, San Francisco, CA (US); Steven Ramkumar, San Francisco, CA (US); Anthony T. Falzone, San Francisco, CA (US)

(73) Assignee: Pinterest, Inc., San Francisco, CA (US)

( * ) Notice: Subject to any disclaimer, the term of this patent is extended or adjusted under 35 U.S.C. 154(b) by 41 days.

(21) Appl. No.: 14/331,837

(22) Filed: Jul. 15, 2014

(65) Prior Publication Data
US 2015/0026642 A1   Jan. 22, 2015

Related U.S. Application Data

(60) Provisional application No. 61/847,078, filed on Jul. 16, 2013.

(51) Int. Cl.
*G06F 3/0482* (2013.01)
*G06F 3/0488* (2013.01)
*G06F 9/451* (2018.01)

(52) U.S. Cl.
CPC ........ *G06F 3/0482* (2013.01); *G06F 3/04883* (2013.01); *G06F 9/451* (2018.02); *G06F 2203/0383* (2013.01)

(58) Field of Classification Search
CPC .. G06F 3/0482; G06F 3/04883; G06F 9/4443; G06F 2203/0383
See application file for complete search history.

(56) References Cited

U.S. PATENT DOCUMENTS

| | | | | |
|---|---|---|---|---|
| 5,261,042 A | * | 11/1993 | Brandt | G06F 9/4443 715/841 |
| 5,754,938 A | * | 5/1998 | Herz | G06Q 20/383 348/E7.056 |
| 5,842,194 A | * | 11/1998 | Arbuckle | G06K 9/6857 382/224 |
| 5,848,396 A | * | 12/1998 | Gerace | G06Q 30/02 705/14.49 |

(Continued)

FOREIGN PATENT DOCUMENTS

| | | |
|---|---|---|
| JP | 2004334705 A | 11/2004 |
| JP | 2005141513 A | 6/2005 |

(Continued)

OTHER PUBLICATIONS

"International Search Report and Written Opinion of PCT/US2014/046770, dated Oct. 27, 2014."

(Continued)

*Primary Examiner* — Jung-Mu T Chuang
(74) *Attorney, Agent, or Firm* — Athorus, PLLC

(57) ABSTRACT

This disclosure describes systems and methods that enable users to easily take action on objects through use of a contextual menu. The contextual menu may be independent of the application and/or device through which the object is accessed and allows the user to perform actions with respect to an object. The selected action may be locally performed and/or performed at a location remote from the client device.

20 Claims, 9 Drawing Sheets

(56) References Cited

U.S. PATENT DOCUMENTS

| | | | | |
|---|---|---|---|---|
| 5,926,178 | A * | 7/1999 | Kurtenbach | G06F 3/0482 715/834 |
| 6,493,006 | B1 * | 12/2002 | Gourdol | G06F 3/0482 715/810 |
| 6,549,219 | B2 * | 4/2003 | Selker | G06F 3/0482 345/902 |
| 6,618,063 | B1 * | 9/2003 | Kurtenbach | G06F 3/0482 715/810 |
| 6,664,991 | B1 * | 12/2003 | Chew | G06F 3/04883 715/812 |
| 6,678,413 | B1 * | 1/2004 | Liang | A61B 5/1113 348/169 |
| 7,246,329 | B1 * | 7/2007 | Miura | G06F 3/0482 715/764 |
| 7,646,895 | B2 * | 1/2010 | Haupt | G06K 9/00295 348/159 |
| 7,668,799 | B2 * | 2/2010 | Nakatomi | G06F 3/04817 707/713 |
| 7,873,710 | B2 * | 1/2011 | Kiley | G06F 17/30867 455/310 |
| 7,966,176 | B2 * | 6/2011 | Bushey | G10L 15/1822 379/80 |
| 8,321,802 | B2 * | 11/2012 | Rogers | G06F 3/04817 715/769 |
| 8,660,734 | B2 * | 2/2014 | Zhu | G05D 1/0055 701/23 |
| 8,694,514 | B2 * | 4/2014 | Frieden | G06F 17/30867 707/749 |
| 8,782,077 | B1 * | 7/2014 | Rowley | G06F 17/30864 707/769 |
| 8,782,554 | B2 * | 7/2014 | Kern | G06F 3/04817 715/808 |
| 9,268,793 | B2 * | 2/2016 | Hu | G06F 17/30247 |
| 9,639,237 | B2 * | 5/2017 | Washington | G06F 3/0482 |
| 2002/0186238 | A1 * | 12/2002 | Sylor | G06F 11/3006 715/736 |
| 2003/0179236 | A1 * | 9/2003 | Good | G06F 17/30707 715/764 |
| 2004/0003096 | A1 * | 1/2004 | Willis | G06F 17/30702 709/228 |
| 2004/0052413 | A1 * | 3/2004 | Kunii | G06K 9/00791 382/159 |
| 2004/0100505 | A1 * | 5/2004 | Cazier | G06F 3/0482 715/811 |
| 2004/0249813 | A1 * | 12/2004 | Singh | G06F 8/20 |
| 2005/0204309 | A1 * | 9/2005 | Szeto | G06F 3/0482 715/811 |
| 2005/0246331 | A1 * | 11/2005 | De Vorchik | G06F 17/30235 |
| 2006/0004914 | A1 * | 1/2006 | Kelly | G06Q 30/00 709/219 |
| 2006/0020597 | A1 * | 1/2006 | Keating | G06F 17/3025 |
| 2006/0117067 | A1 * | 6/2006 | Wright | G06F 17/30017 |
| 2006/0200780 | A1 * | 9/2006 | Iwema | G06F 3/0488 715/810 |
| 2007/0050325 | A1 * | 3/2007 | Nakatomi | G06F 3/04817 |
| 2007/0050468 | A1 * | 3/2007 | Gazit | G06K 9/228 709/217 |
| 2007/0136690 | A1 * | 6/2007 | MacLaurin | G06F 3/0482 715/822 |
| 2007/0180392 | A1 * | 8/2007 | Russo | G06F 3/0482 715/765 |
| 2008/0059913 | A1 * | 3/2008 | Burtner | G06F 3/0482 715/854 |
| 2008/0065737 | A1 * | 3/2008 | Burke | G06F 17/30058 709/217 |
| 2008/0189360 | A1 * | 8/2008 | Kiley | G06F 17/30867 709/203 |
| 2008/0222569 | A1 * | 9/2008 | Champion | G06F 3/0482 715/834 |
| 2008/0228685 | A1 * | 9/2008 | Shivaji-Rao | G06F 9/4443 706/46 |
| 2008/0301180 | A1 * | 12/2008 | Klassen | H04M 1/72555 |
| 2009/0094512 | A1 * | 4/2009 | Szeto | H04L 12/5845 715/234 |
| 2009/0187860 | A1 * | 7/2009 | Fleck | G06F 3/0482 715/834 |
| 2009/0231356 | A1 | 9/2009 | Barnes et al. | |
| 2009/0327963 | A1 * | 12/2009 | Mouilleseaux | G06F 3/04883 715/834 |
| 2010/0011310 | A1 * | 1/2010 | Rainisto | G06F 3/0482 715/769 |
| 2010/0077354 | A1 * | 3/2010 | Russo | G06F 3/0482 715/834 |
| 2010/0122194 | A1 * | 5/2010 | Rogers | G06F 3/04817 715/769 |
| 2010/0131869 | A1 * | 5/2010 | Adachi | G06F 8/00 715/760 |
| 2010/0153862 | A1 * | 6/2010 | Schreiber | G06F 9/4448 715/760 |
| 2010/0271312 | A1 | 10/2010 | Alameh et al. | |
| 2010/0306702 | A1 * | 12/2010 | Warner | G06F 3/0482 715/811 |
| 2011/0055759 | A1 * | 3/2011 | Robert | G06F 3/04817 715/825 |
| 2011/0060995 | A1 * | 3/2011 | Whalen | H04L 41/0893 715/736 |
| 2011/0066980 | A1 * | 3/2011 | Chmielewski | G06F 3/0482 715/834 |
| 2011/0093815 | A1 * | 4/2011 | Gobeil | G06F 3/0482 715/825 |
| 2011/0119628 | A1 * | 5/2011 | Carter | G06F 3/0482 715/812 |
| 2011/0202879 | A1 * | 8/2011 | Stovicek | G06F 3/0482 715/828 |
| 2011/0209093 | A1 * | 8/2011 | Hinckley | G06F 3/04817 715/834 |
| 2011/0244919 | A1 * | 10/2011 | Aller | G06K 9/00973 455/556.1 |
| 2011/0265035 | A1 * | 10/2011 | Lepage | G06F 3/0482 715/810 |
| 2011/0265041 | A1 * | 10/2011 | Ganetakos | A63F 13/12 715/834 |
| 2011/0307780 | A1 * | 12/2011 | Harris | G06F 17/30861 715/708 |
| 2012/0110507 | A1 * | 5/2012 | Washington | G06F 3/0482 715/825 |
| 2012/0227000 | A1 * | 9/2012 | McCoy | G06F 3/0482 715/762 |
| 2013/0019172 | A1 * | 1/2013 | Kotler | G06F 3/0482 715/711 |
| 2013/0019175 | A1 * | 1/2013 | Kotler | G06F 3/0482 715/728 |
| 2013/0019182 | A1 * | 1/2013 | Gil | G06F 3/0482 715/738 |
| 2013/0019203 | A1 * | 1/2013 | Kotler | G06F 3/04812 715/811 |
| 2013/0019204 | A1 * | 1/2013 | Kotler | G06F 3/04812 715/833 |
| 2013/0019208 | A1 * | 1/2013 | Kotler | G06F 3/04812 715/835 |
| 2013/0073568 | A1 * | 3/2013 | Federov | G06F 17/30867 707/749 |
| 2013/0086056 | A1 * | 4/2013 | Dyor | G06F 3/167 707/730 |
| 2013/0091467 | A1 * | 4/2013 | Pallakoff | G06F 3/0482 715/835 |
| 2013/0132874 | A1 * | 5/2013 | He | G06F 3/04817 715/765 |
| 2013/0132904 | A1 * | 5/2013 | Primiani | G06F 3/04886 715/834 |
| 2013/0222292 | A1 * | 8/2013 | Wang | G06F 3/041 345/173 |
| 2013/0257769 | A1 * | 10/2013 | Sheik-Nainar | G06F 3/0488 345/173 |
| 2013/0283274 | A1 * | 10/2013 | Mimran | G06F 9/46 718/100 |
| 2014/0062894 | A1 * | 3/2014 | Werner | G06F 3/0488 345/173 |

(56) References Cited

U.S. PATENT DOCUMENTS

| | | | | |
|---|---|---|---|---|
| 2014/0078406 A1* | 3/2014 | Friedman | ......... | H04N 21/42204 348/734 |
| 2014/0137042 A1* | 5/2014 | Du | ....................... | G06F 3/0482 715/834 |
| 2014/0280531 A1* | 9/2014 | Liu | ........................ | H04L 67/22 709/204 |

FOREIGN PATENT DOCUMENTS

| | | |
|---|---|---|
| JP | 2006338458 A | 12/2006 |
| JP | 2007087374 A | 4/2007 |
| JP | 2007141190 A1 | 6/2007 |
| JP | 2008244633 A1 | 10/2008 |
| JP | 2010009224 A | 1/2010 |
| JP | 2011107823 A1 | 6/2011 |
| JP | 2011187014 A1 | 9/2011 |
| JP | 2012508929 A | 4/2012 |

OTHER PUBLICATIONS

Kevin Smith, "This App is Going to Change the Way You Read News on Your iPhone," "Prismatic Walkthrough," Aug. 23, 2012, www.businessinsider.com/prismatic-walkthrough-2012-8.

Article from Nikkei PC Beginners.

Extended European Search Report for EP Application No. 14826547.3 dated Feb. 20, 2017.

Japan Office Action for Japanese Patent Application No. 2016-527055 dated Feb. 6, 2017.

3rd Examination Report for AU Patent Application No. 2014290148 dated Sep. 11, 2017.

Decision to Grant a Patent for JP Application No. 2016-527055 dated Sep. 11, 2017.

Second Examination Report for AU Patent Application No. 2014290148 dated May 22, 2017.

* cited by examiner

OBJECT BASED CONTEXTUAL MENU CONTROLS

CROSS-REFERENCE TO RELATED APPLICATIONS

This application claims the benefit of U.S. Provisional Application No. 61/847,078, filed Jul. 16, 2013 entitled "Object Based Radial Menu Controls," which is incorporated herein by reference in its entirety.

BACKGROUND

People are increasingly interacting with computers and other electronic devices in new and interesting ways. With the increased processing capabilities, connectivity and location tracking, electronic devices have become widespread and used in many everyday activities. For example, people often use electronic devices to search for products, watch videos, listen to music, research, shop for both digital and physical products ("e-commerce"), and receive news, just to name a few. Other uses include communicating with social communities, friends and family, photography, and many others.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes, in part, systems and methods that enable users to take actions on an object utilizing a contextual menu that is independent of the application and/or program through which the object is presented. For example, a user may view an object (e.g., image) on a display of a computing device, invoke a contextual menu and select an action from a group of actions available from the contextual menu and have that action performed on the selected object. As discussed in further detail below, the actions and/or the contextual menu itself may be independent of the application through which the object is presented. Likewise, the performance of the actions may be local to the device and/or remote from the device.

Figure 1A:
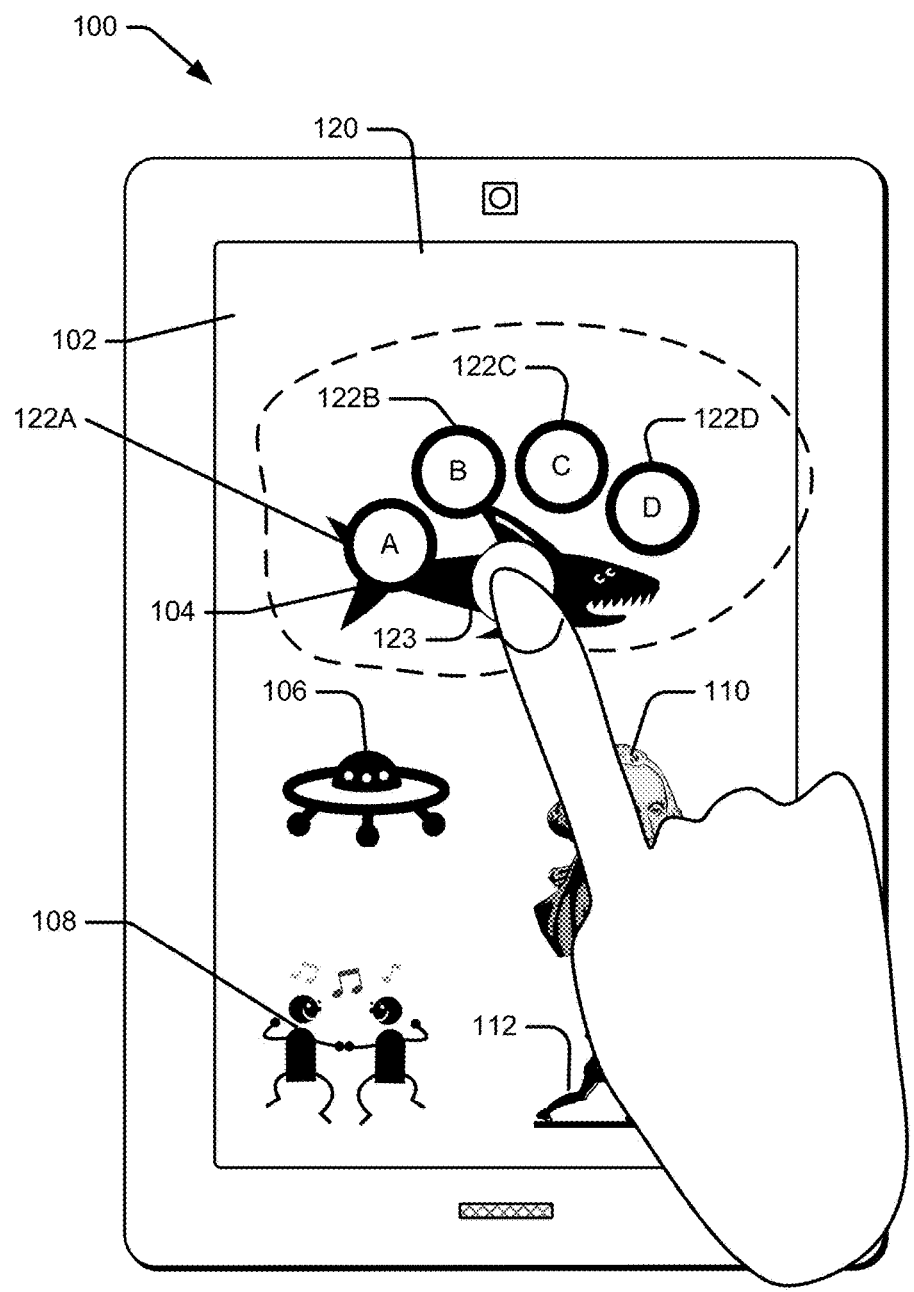
FIG. 1A is a block diagram of an example user interface for presenting a contextual menu for an object, according to an implementation.

FIG. 1A is a block diagram of an example user interface for presenting a contextual menu for an object, according to an implementation. The example presented with respect to FIG. 1A illustrates one implementation for presenting a contextual menu 120 to a user and initiating the performance of an action based on a selection of an action identifier from the user. In this example, a user, Adam, may utilize a portable computing device 100 that includes a touch-based display 102 to view multiple images 104, 106, 108, 110, 112 (each image is an example of an "object," as discussed herein). The objects may be presented to the user utilizing any application, such as a news feed, social networking application, video, photo viewer, email application, Internet browser, etc. While viewing the objects, the user, Adam, may select one of the objects, such as an image of a shark 104, by placing their finger or other input device on the display 102 of the portable computing device 100 and leaving the input device touching the display 102 for a period of time (e.g., two seconds) (this process of selection is referred to herein as a "long press"). The selection of the object and/or the long press may also be considered an invocation command to invoke a contextual menu. In response to the invocation command, a contextual menu 120 may be presented to the user that includes one or more action identifiers 122A-122D. In this example, each action identifier is represented by a graphical circle. In other implementations, the action identifiers 122 may be presented using any type of graphical or other user identifiable shape, position, color, sound, etc. Likewise, while this example includes four action identifiers, other implementations may include additional or fewer than four action identifiers. In some implementations, the action identifiers may be represented textually, using images, or a combination of both text and images.

An object may be selected and/or the contextual menu invoked using actions other than, or in addition to, a touch-input on a display. For example, a user may hover their finger (or other input device) a defined distance over the presented object and have the hover detected. In another example, images of the user's head and/or eyes may be captured and processed to determine a gaze direction of the user and the gaze direction utilized as the selection.

Action identifiers may represent one or more actions that can be performed on the selected object. For example, an action may be to send a message (e.g., email, short message system (SMS), multimedia message system (MMS)) that includes the object, post the object on a social networking site or platform, add a comment to the object, purchase the object, search for similar objects, add the object to a set maintained for the user by an object management service (discussed below), remove the object from a set maintained for the user by an object management system, promote the object, identify other users that have taken actions with respect to the object, report the object (e.g., report the object as offensive to the object management system), save the object on the device, download the object, etc. As discussed below, actions may be performed locally on the device and/or at remote locations (e.g., the object management service).

In some implementations, the actions and corresponding action identifiers presented as part of the contextual menu may be contextual and determined based on one or more of an identity of the user, a prior action selected by the user, an object, a prior object selected by the user, and/or a relationship between the object and the user, etc. Accordingly, each time a contextual menu is presented, it may be different depending on the user, the user's current and/or past activities, the selected object, etc.

For example, prior action selections by the user, user defined preferences, actions performed on prior objects selected by the user that are similar to the currently selected object, etc., may be considered and utilized to select one or more action identifiers to present as part of the contextual menu. In one example, a weighting function may be used to determine actions and corresponding action identifiers to present to the user with the contextual menu. The weighting function may consider past actions selected by a user and each action given a decaying weight value based on a time since the action was last performed. Likewise, for any actions performed by the user while on the same or similar presentation area of where the contextual menu is being invoked may be given additional weight. Each of the prior action weighting values may then be summed (the same actions performed at different times combined) and actions with the highest weighting values may be presented to the user as part of the contextual menu. In other implementations, the currently selected object may be processed (e.g., using image recognition algorithms) and compared with other objects previously selected by the user and actions performed on prior objects having a high similarity with the currently selected object may be given an additional weight.

In some implementations, the contextual menu may also identify the selected object and/or include an input identifier that identifies the approximate location of the received input. For example, the location of the invocation command is represented in FIG. 1A by the input identifier 123 under the user's finger. The action identifiers may be presented around and a defined distance from the input identifier to enable easy selection by the user. For example, as illustrated in FIG. 1A, the action identifiers may each be presented a defined distance from the input identifier in a radial pattern around the input identifier. In other implementations, the input identifiers may be presented in different configurations and/or orientations.

Upon presentation of the contextual menu 120, the user may then remove their finger (or other input device) from the touch based display 102 and/or slide their finger (or other input device) along the display to one of the action identifiers 122A-122D and select an action identifier 122A-122D by, for example, long pressing the action identifier (e.g., leaving their finger position over the action identifier for a defined period of time—e.g., 2 seconds) or removing their finger from the display to select the action identifier upon which their finger was positioned when removed from the display. For example, the user, Adam, may select an action identifier 122A which relates to adding the object to a set maintained for the user by an object management service by moving their finger over the action identifier 122A and removing their finger from the display.

Similar to invoking the contextual menu, other inputs such as gaze detection, hover, etc., may be utilized to select an action identifier.

Upon receiving the selection of an action identifier, the action corresponding to the selected action identifier may be initiated. In this example, the initiation of the action includes sending action information to the object management service. The action information may include the object, user information, action commands, and/or optionally additional information about the object (e.g., source of the object, object rights holder, etc.).

The object management service, upon receiving the action information, may perform the identified action. In this example, the object management service may create an object identifier for the object and associate the created object identifier with a set maintained by the object management service for the user. In some implementations, as discussed below with respect to FIG. 1B, upon selection of an action identifier, one or more action options corresponding to the selected action may be determined and a corresponding action option identifier presented to the user for selection.

For purposes of discussion, an "object identifier," as used herein, is a collection of one or more items of information that identifies an object. The object identifier may include any combination of: a representation for the object, such as a graphical representation, audible representation, or other representation of the object; a context for the object as understood by the user; a description of the object provided by the user; static information about the object; supplemental information about the object; the set to which the object belongs (discussed below); the source of the object; any parent object identifier from which the object identifier was created; and any identification of other similar object identifiers. As will be appreciated, additional or fewer items of information may be included in an object identifier.

A context represents information about an object as understood by the user. The context explains why the object is important to the user that created the object identifier. In some implementations, context(s) may be provided directly by the user or determined based on other information provided by or about the user. Static information about an object may be any information about the object that does not change. Such information may be provided by the user, by other users, by external sources, and/or by the methods and systems described herein.

Supplemental information, as used herein, may be any additional information that may be associated with a representation of an object, an object identifier and/or a set. In some implementations, supplemental information may be periodically updated by external sources, users, and/or include actions that may be performed by users interacting with the object identifier. For example, supplemental information may include local weather at an object's location. When a user views the object identifier, the supplemental information may be automatically updated to show the current weather at the location or the forecasted weather at the location during the time the user plans to visit.

Supplemental information associated with an object identifier may be provided by one or multiple sources. For example, if the object identified by an object identifier is a television, the source of the object may be Sony, the maker of the television. Sony may provide supplemental information about the television, such as the dimensions, weight, features, etc. Other external sources, such as resellers of the television, may also be associated with and provide supplemental information for the object. For example, each seller of the television may provide supplemental information identifying their price, location, hours of operation, etc.

The methods and systems described herein further enable users to manage, search for, share and discover objects by organizing object identifiers into "sets." For example, users may create one or more sets and, in response to receiving an action selected from a contextual menu for an object, have an object identifier representative of the user selected object automatically associated with a set. Generally, a "set" is a collection of object identifiers created by a user. In one implementation, each set may include any number of object identifiers, including zero (a null set). An object identifier may be associated with one or many sets. In one implementation, an object identifier may only be associated with one set.

Users can create object identifiers and add them to sets through interaction with a contextual menu and selecting to add an object to a set. An "object" may be anything that can be represented. For example, a user may interact with a contextual menu to create an object identifier for a television show, an image, a physical object, a sound, a smell, a web page, a location, a digital object, and the like. Object identifiers created with representations provided or identified by a user are considered parent object identifier relationships. Object identifiers created based on existing object identifiers are considered child object identifiers. An object identifier may have any number of parent and/or child object identifiers. As discussed further below, relationships (e.g., parent/child) between object identifiers may be maintained to allow users to discover other objects and to understand the source of the object represented by an object identifier.

Figure 1B:
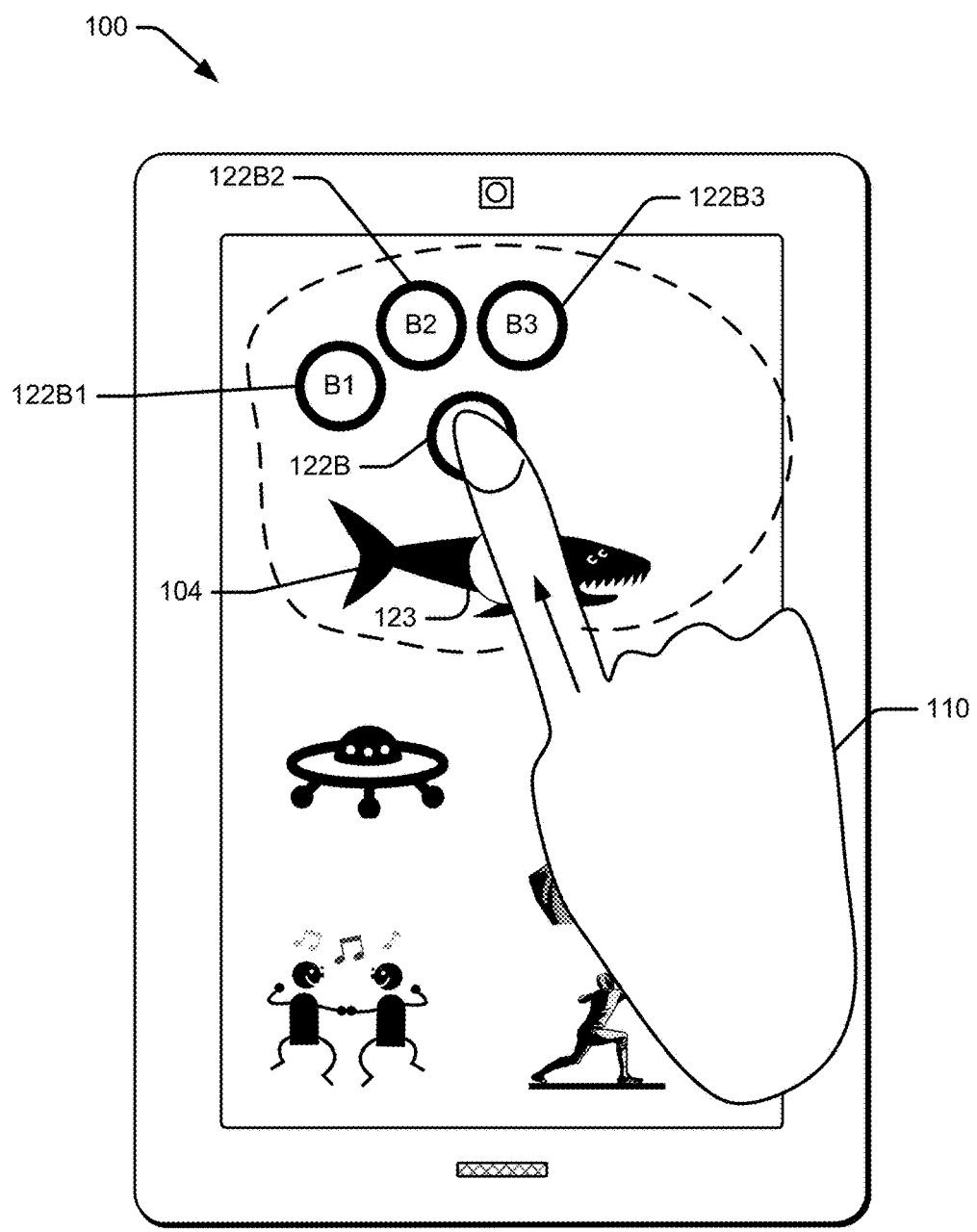
FIG. 1B is a block diagram of an expanded contextual menu, according to an implementation.

FIG. 1B is a block diagram of an example user interface for presenting action option identifiers upon selection of an action from a presented contextual menu, according to an implementation. In some implementations, when a user selects an action identifier, one or more action options may be determined and corresponding action option identifiers 122B1-122B3 presented to the user for selection. While the example illustrated in FIG. 1B shows three action option identifiers, in other implementations, there may be fewer or greater action options and corresponding action option identifiers presented to the user.

Action options may be any options corresponding to a selected action. For example, if the user selects the action of adding the object to a set maintained for the user by the object management service, the action options may identify different sets maintained for the user by the object management service to which the object may be added. For example, if the user has created more than one set, the object management service may determine the sets that are most likely to be selected by the user and action option identifiers representative of those sets may be presented to the user for selection.

To illustrate, referring briefly back to FIG. 1A, if the user selects an image 104 of a shark and selects the action of adding the image of the shark to a set maintained for the user by the object management service, the object management service may determine sets associated with the user that are most likely to be selected by the user for adding the selected image (action options). Action option identifiers representative of those action options may be presented to the user. For example, if the user has created five sets that are maintained for the user by the object management service, set one contains images of fish, set two contains images of buildings, set three contains images of water features, set four contains images of dogs and set five contains images of cars, the object management service may determine which of those sets are most likely to be the sets with which the user desires to associate the selected image. Determining sets may be accomplished using a variety of techniques. For example, the object management service may consider information about the selected image (e.g., metadata), the last set to which the user added an image, the metadata about the sets, object identifiers associated with the sets, images associated with the sets, contextual information about the selected image, sets maintained for the user by the object management service, etc.

Returning to the example, the object management service may determine that the set containing images of fish and the set containing images of water features are the most likely sets for addition of the selected image. Based on the determination, action option identifiers representative of those sets (action options) may be presented to the user for selection. For example, action option identifier 122B1 may correspond to the set that includes images of fish, and action option identifier 122B2 may correspond to the set that includes images of water features. Action option identifier 122B3 may represent a menu option that is selectable by the user to select other available action options corresponding to the selected action.

A user may select an action option identifier in a manner similar to selection of an action. For example, the user may touch the representation of the action option on the display screen using a long press and/or the user may slide their finger 110 (or other input device) from the selected action identifier 122B to the desired action option identifier, 122B1-122B3. The action option may be selected by the user long pressing on the action option, removing their finger from the display after their finger is positioned over the action option, gaze detection, hovering their finger over the action option, etc.

Upon selection of an action option, the selected action is performed for the selected action and the corresponding action option. In some implementations, even if action options are presented, the user may not select and action option and instead initiate the action as if there were no action options presented. Continuing with the above example, while the user's finger is still positioned on the display at the location of the selected action identifier, the user may initiate the selected action by removing their finger from the display. In such an implementation, rather than the action being performed for the object and a selected action option, the action is initiated with respect to the selected object. For example, if the selected action is to add the object to a set maintained for the user by the object management service, when the user initiates the action without selecting an action option, a list or other presentation of sets maintained by the user may be presented to the user for selection. The user may then select a set with which the object is to be associated.

If the user decides that they do not want to perform an action, they may cancel the contextual menu by moving their finger (or other input device) to an area that does not include the contextual identifier. For example, referring to FIG. 1B, rather than selecting an action option 122 or initiating the action, the user may slide their finger downward on the display and the contextual menu is canceled and removed from presentation.

Figure 2:
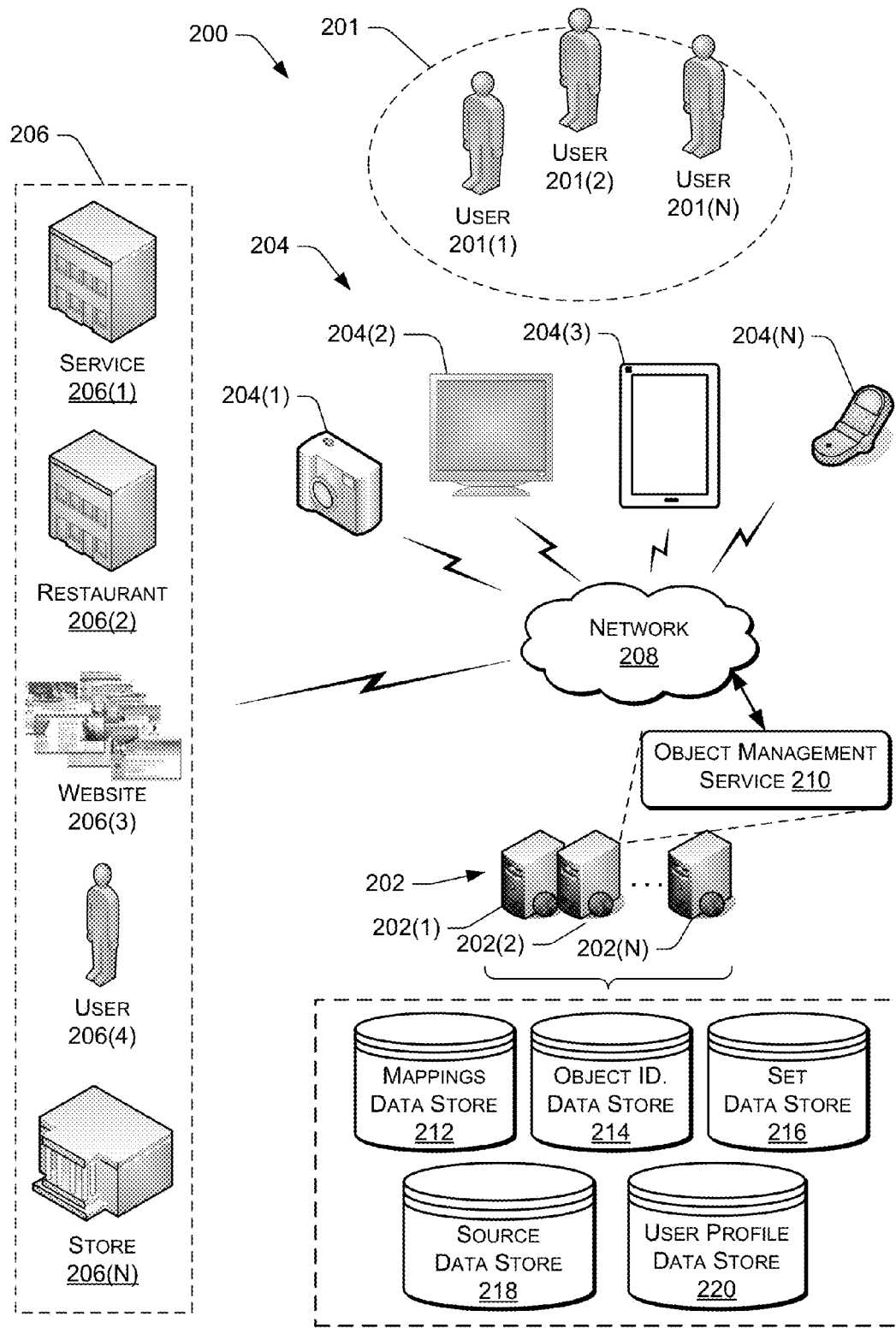
FIG. 2 is a pictorial diagram of an illustrative environment that includes a server system and a client device communicatively connected via a network.

FIG. 2 is a pictorial diagram of an illustrative environment 200 that includes users 201, such as users 201(1), 201(2)-201(N), a server system 202 that includes one or more server computers 202(1), 202(2)-202(N), one or more client devices 204, such as client device 204(1), 204(2), 204(3)-204(N), and one or more external sources 206, such as a service offering 206(1), restaurant 206(2), website 206(3), user 206(4)-store 206(N), communicatively connected via a network 208. As will be appreciated, any number and/or type of server systems 202, client devices 204 and/or external sources 206 may be included in the environment 200 and those illustrated in FIG. 2 are only exemplary. Likewise, any number of users 201 may be included in the environment 200. For purposes of this discussion, the term "user" will be used herein to refer to an individual interacting with the server system 202, client device 204, and/or the object management service 210 (discussed below).

The network 208 may include a local area network, a wide area network, such as a public switched telephone network (PSTN), a cable television network, a satellite network, a collection of networks, a public Internet protocol network, a private Internet protocol network, or a combination thereof. Moreover, the network 208 may be wired, wireless, or a combination of the two. The server system 202 may also include a mappings data store 212, an object identifier data store 214, a set data store 216, a source data store 218, and a user profile data store 220. As discussed further below, the data stores may include lists, arrays, databases, and other data structures used to provide storage and retrieval of data. Likewise, while the disclosure describes multiple data stores, in some implementations, the data stores may be configured as a single data store or multiple data stores.

The mappings data store 212, object identifier data store 214, set data store 216, source data store 218, and user profile data store 220 may be integrated with the server system 202 or otherwise communicatively coupled with the server system 202. For example, one or more of the mappings data store 212, object identifier data store 214, set data store 216, source data store 218, and user profile data store 220 may be located at a remote computing resource (not shown) and communicatively coupled with the server system 202. In some implementations, the mappings data store 212, object identifier data store 214, set data store 216, source data store 218, and user profile data store 220 may include one or more CD-RW/DVD-RW drives, hard disk drives, tape drives, optical drives, or other storage devices that are utilized to store digital content and information. The server system 202, separately or together with the mappings data store 212, object identifier data store 214, set data store 216, source data store 218, and user profile data store 220, may provide an object management service 210 that responds to a user initiation of an action on an object via a contextual menu. For example, the object management service 210 may receive action information from a device 204 and perform those actions.

In some implementations, the server system 202 may also be configured to exchange information with one or more external sources 206. The external sources 206 may include any type of entity and/or individual(s) that provides a service, product or information that may be used to supplement an object identifier and/or representation of an object. For example, external sources 206 may include a service offering 206(1), such as local weather, time, streaming video of a location, etc., restaurants 206(2), websites 206(3), users 206(4) and stores 206(N), such as a toy store, grocery store, electronic commerce (e-commerce) store, book store, etc. External sources may be associated with a fixed location(s), such as their place of business, a location that may change (e.g., hiking guide, mobile health provider) depending on the external sources' current location, or no location at all (e.g., digital or virtual business). Digital or virtual businesses, such as websites 206(3), include any form of e-commerce or other digital offering that may provide supplemental information.

For example, an e-commerce site may include code that presents a contextual menu for an object in response to a user invoking the contextual menu for the object (e.g., receiving a long press on the object). A user, when viewing the website, may invoke the contextual menu and initiate an action on the selected object, which may include the object management service creating an object identifier representative of the object and associating that object identifier with a set maintained by the object management service for that user.

In some implementations, the external source 206 may interact with the object management service 210 and provide representations for objects along with supplemental information that could then be used to form object identifiers for users. For example, if the external source 206 is a television broadcast station, the television broadcast station may provide graphical representations for broadcast shows, commercials, etc. The station may also provide other supplemental information for those shows which may include, among other things, information about the show and/or objects represented in the show (e.g., actors, products, locations, genre, year, setting), information about the broadcast station, etc. When a user invokes a contextual menu for the show (an object) or an object represented in the show, the supplemental information may be utilized by the object management service to perform the requested action with respect to the object.

The external source may also periodically update one or more items of supplemental information. Those updates are reflected in the object identifiers that include the representation and/or supplemental information provided by the external source.

Returning to FIG. 2, client devices 204 may include personal computers, tablet computers, eBook reader devices, laptop computers, desktop computers, netbooks, personal digital assistants (PDA), portable gaming devices, wireless communication devices, such as smart phones or mobile handsets, set-top-boxes, game consoles, cameras, audio recorders/players, or any combination thereof. As will be described with regard to the implementations shown herein, the server system 202 is configured to exchange data and information, including information about users, action commands, objects, contextual menus, sets, representations, object identifiers, and other like information with the client device 204. For example, the object management service 210 may interact via the server system 202 to receive an action instruction, user identification and object and perform the requested action on the received object.

Likewise, a user 201 may interact with the object management service 210, via a client device 204, to create, discover and view object identifiers and sets of object identifiers, obtain information about (or purchase) objects identified by an object identifier, initiate performance of actions available from a contextual menu, modify the actions available from a contextual menu, and/or to communicate with others.

In some implementations, contextual menus may be presented differently based on the client device 204 used to access the object management service 210. For example, if the client device 204 is a portable device with limited display space and/or capabilities, contextual menus may be displayed with reduced information (e.g., only graphical identifiers with no textual descriptions). In comparison, if the client device 204 is a laptop, desktop, television or other device with a larger display, additional information, such as a brief description of each action identifier, may be presented. Likewise, a contextual menu may be invoked through different actions depending on the device 204 capabilities. For example, if the device includes a touch-based display, the contextual menu may be invoked through a long press, or other touch-based action. If the device does not include a touch-based display, the contextual menu may be invoked through use of another input component (e.g., mouse, keyboard).

The mappings data store 212 stores information about the relationships between object identifiers, sets, users, representations and external sources that provide supplemental information. For example, for each object identifier, a link or other reference to the source of the object represented by the object identifier is maintained. Likewise, if the object identifier was added to a user's set from another object identifier, not only is the relationship between the user's set and the object identifier maintained, a link between the prior object identifier (the parent) and the current object identifier is also maintained. In some implementations, there may be a chain of relationships/links between multiple object identifiers, each link representing a parent object identifier from which the current object identifier was created.

For example, user A may create an object identifier representing the Empire State Building and include an image of the Empire State Building (representation) taken by user A. That object identifier may be associated with user A's set of object identifiers called "Buildings I Visited on Vacation." User A may also provide a description for the object identifier, supplemental information may be associated with the object identifier and/or a context may be established for the object identifier.

User B may view user A's object identifier, invoke a contextual menu by long pressing on user A's object identifier and select the action to create their own object identifier from user A's object identifier and add it to one of user B's sets of object identifiers. In this example, a new object identifier is created for user B that includes the representation of the Empire State Building from user A's object identifier and is associated with one of user B's sets. User B may utilize the description provided by user A or add his/her own description. The object management service 210 may determine a context for user B's object identifier based on information about the set to which user B added the object identifier, the description chosen or added by user B and/or other information that will enable the object management service 210 to determine a context for user B's object identifier that provides meaning to the object identifier from the perspective of user B. In other implementations, user B may provide the context. A link or other relationship between user A's object identifier and user B's object identifier is maintained in the mappings data store 212.

The object identifier data store 214 maintains information about each object identifier created by the object management service 210. For example, for each object identifier, the object management service 210 may store in the object identifier data store 214 information as to the representation included in the object identifier, the set with which the object identifier is associated, the user that created the object identifier, the context for the object identifier, any user provided description for the object identifier, any supplemental information associated with the object identifier, the source of the representation included in the object identifier and any parent object identifier from which information was obtained. Additional description about the object identifiers is provided below with respect to FIG. 4.

The set data store 216 includes information about each set established by users of the object management service 210. As discussed above, a set is a collection of object identifiers selected and/or created by a user. A set may be a null set that does not include any object identifiers. Likewise, any number of object identifiers may be associated with a set. The set data store 216 for each set stores information that identifies the user that created the set, the context for the set, a category for the set, any user provided description for the set, any static information associated with the set and an identification of objects associated with the set. Additional description about sets is provided below with respect to FIG. 4.

The source data store 218 stores information about sources of objects that are represented by object identifiers managed by the object management service 210 and/or information about external sources that provide supplemental information associated with representations of one or more objects. In some examples, the source may be a website from which an object (e.g., image) was obtained to create an object identifier.

The source data store 218 may include any form of information about each source including, but not limited to, the name of the source, whether the source has been verified by the object management service 210, the type of information provided by the source, identification of representations associated with the source, and the like.

The user profile data store 220 stores information about users 201 of the object management service 210. Any type of information may be stored in the user profile data store 220. For example, user profile information, such as attributes, name, address, gender, browse history, object identifier history, set history, social networks and/or friends with which the user 201 interacts, and the like may be stored in the user profile data store 220. User profile information may be provided directly by users 201 and/or collected from users 201 of the client devices 204 when interacting with the object management service 210 (e.g., clickstream data as the user explores the object management service 210), when viewing, creating or interacting with sets, when viewing, creating or interacting with object identifiers, and/or when sharing information with friends or social communities through the object management service 210. In some implementations, user information may be obtained from external sources. For example, user profile information may be obtained from a third party with which the user is also affiliated (e.g., e-commerce web site, social network) and has agreed to allow sharing of some or all user profile information provided to that third party and/or collected by that third party. In some implementations, users of the object management service 210 may choose to limit the amount of information included in their user profile, to limit access to their user profile information and/or to limit what information is shared, if any, from their user profile information.

In addition to maintaining information about mappings, object identifiers, sets, sources, and users, the object management service 210 may provide use information back to the users 201 and/or the external sources 206. For example, the object management service 210, through communication between the server system 202 and a client device 204, may provide use information back to a user 201. Such information may include an identification of object identifiers recently viewed, created or added, identification of others that have viewed the user's sets, object identifiers, and the like. Likewise, the object management service 210, through communication between the server system 202 and the external sources 206, may provide information to the external sources 206. Such information may include analytics about representations of objects associated with the external source 206, other external sources that may be associated with and provide supplemental information for an object with which the external source is associated, and the like.

Figure 3:
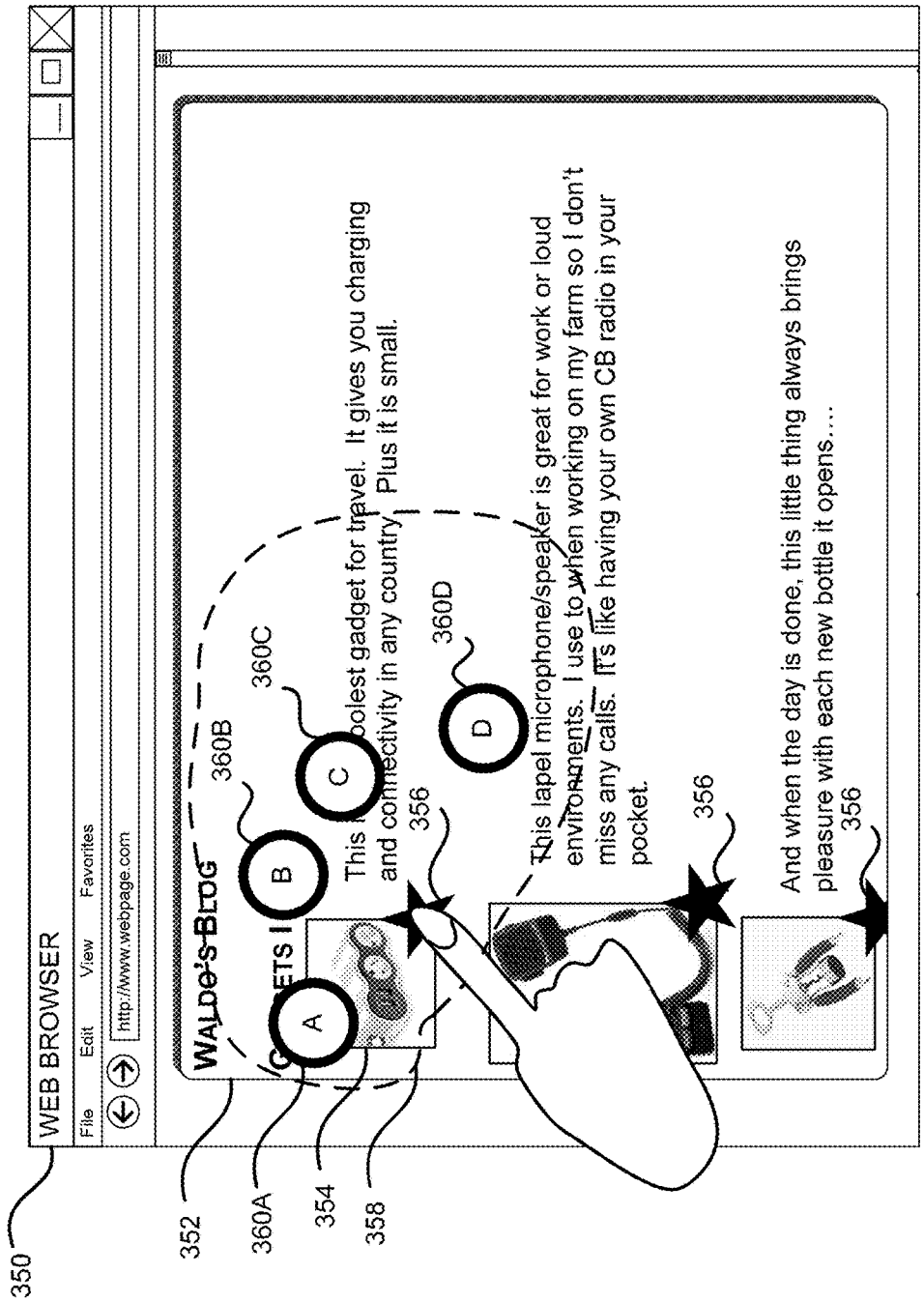
FIG. 3 is a block diagram of an example user interface for presenting a contextual menu for an object, according to an implementation.

FIG. 3 provides an example of a user interface 350 of an external website, Waldo's Blog 352, that includes the ability for a user to invoke a contextual menu for objects represented on the interface 350, according to an implementation. In various implementations, external websites may include code that enables a user to invoke a contextual menu for an object. For example, the external website may include java script code in their website such that, when a user submits a long press on an object, a contextual menu for performing actions on the selected object is provided to the user. In other implementations, the user may install an application plug-in (e.g., browser plug-in) that receives the invocation for the contextual menu and initiates the user selected actions. In still other implementations, the browser or other application may be configured to allow invocation of a contextual menu and include code for the contextual menu as part of the browser application. Finally, in some implementations, the operating system of the client device 204 may be configured to include code for invoking a contextual menu for a selected object.

Regardless of how the contextual menu is provided, a user may invoke the contextual menu with an invocation command. In this example, a contextual menu identifier 356 is included in the presented information and a user may invoke a contextual menu for a represented object by selecting the corresponding contextual menu identifier 356 for that object. While this example includes presentation of a contextual menu identifier 356, in other implementations, the user may invoke the contextual menu utilizing other invocation commands on the represented object (e.g., long press).

Upon invocation of the contextual menu for the selected represented object, a contextual menu 358 for the selected object is presented. The contextual menu may include one or more action identifiers that may be selected by the user to initiate a corresponding action for the selected object. As noted above, the contextual menu is independent of the application and may be used to initiate local and/or remote actions. In some implementations, the user may be able to configure the action identifiers that are presented by the contextual menu.

In this example, the contextual menu 358 includes four action identifiers 360A-360D, any one or more of which may be selected to invoke an action for the selected object 354. As noted above, the actions may be performed local to the client device 204 (e.g., save, email, copy, print) or remote from the client device (e.g., post to a social network, create an object identifier, add to a set, purchase the represented object, see others that have taken action on the object and/or object identifier). For example, a user may select an action identifier to add the object represented by object identifier 354 to a set maintained for that user by the object management service. Upon selecting the action identifier 360, an object identifier may be created that includes the object 354, information about the source of the object, etc.

In some instances, the object management service 210 may also determine if there are merchants that offer the represented object for sale and may associate those merchants with the created object identifier. In still other examples, the provider of the webpage may be a merchant and/or may identify a merchant that offers the represented object for sale. In such an example, the merchant information may be provided with the representation and included as part of the created object identifier.

As discussed above, in some implementations, selection of an action identifier may result in one or more action options being determined that correspond to the selected action identifier and action option identifiers corresponding to those action options may be presented to the user for selection. The user may select an action option by, for example, long pressing on the presented action option identifier.

Figure 4:
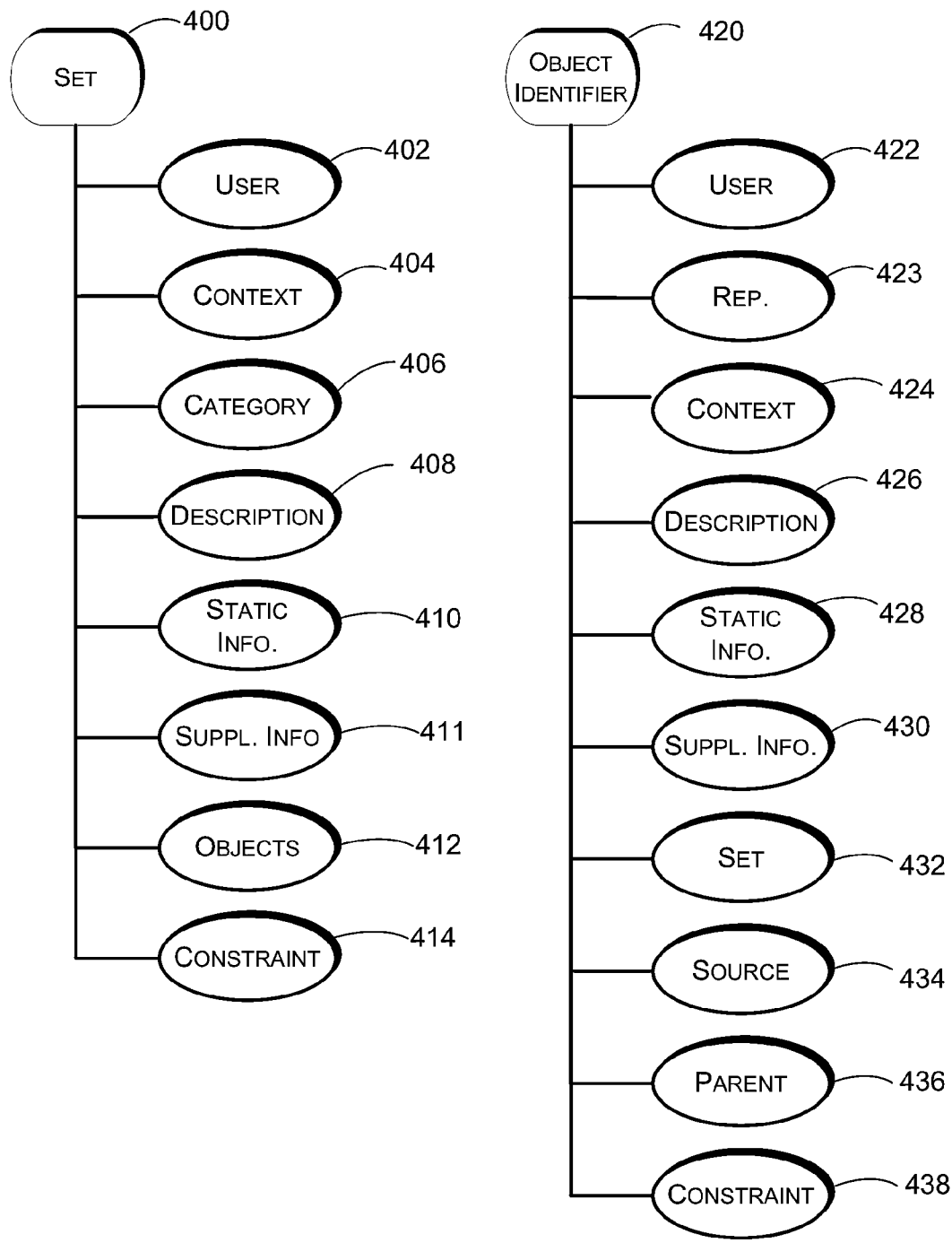
FIG. 4 is a block diagram of an example structure of a set and an object identifier, according to an implementation.

FIG. 4 is a block diagram of an example structure of a set 400 and an object identifier 420, according to an implementation. A set 400 may include an identification of the user 402 that created the set and any users that have been identified as allowed to add object identifiers to the set. In addition, a context 404 as provided by a user or determined by the object management service 210, may be associated with the set 400 along with a user selected category 406. A category 406 may be selected from a list of preexisting categories provided by the object management service 210. For example, a category 406 may be animals, books, arts and entertainment, sports, food and drink, etc., and a user, upon creating a set 400, may select one or more of those categories for association with the set 400. A user may also provide a description 408 providing information about the set 400 from the user's perspective. Static information 410 may also be associated with the set 400. For example, the object management service 210 may automatically incorporate certain information relevant to a set 400 based on the selected category and optionally the provided description 408. Static information 410 may also include information provided by the creator of the set and/or other users of the object management service 210. For example, other users may view, comment and/or otherwise provide feedback with respect to a set. Comments and/or other feedback from the creator and/or other users may be associated with the set 400 and maintained as static information 410.

Supplemental information 411 relevant to the set 400 may also be maintained. Supplemental information for a set may be any form of information or action provided by a source of one or more representations associated with the set, a source of one or more objects associated with a set, or any other external source. For example, if the set is about Hawaii, a weather service (external source) may provide supplemental information in the form of weather in Hawaii that is associated with the set. As object identifiers are added to the set 400, they may be identified as objects 412 associated with the set 400.

Finally, constraints 414 may also be associated with the set 400 and used to control access, modification or other aspects of the set 400. For example, the creator of a set 400 may specify constraints as to who can view the set, add object identifiers to the set, whether users can comment on the set, etc.

In some implementations, an object identifier 420 may include an identification of the user 422 that created the object identifier 420, a user provided description 426 describing the object identifier from the user's perspective, a context 424 as provided by a user or determined by the object management service 210 and static information 428.

Similar to the set 400, the static information 428 may be included in the object identifier 420 by the object management service 210 based on the selected representation 423 of the object and/or the description provided by the user. For example, if a user has selected a representation 423 of the object that is already known to the object management service, existing information about the representation may be included in the object identifier 420. The static information may also identify whether the object identifier was created in response to an action selected from a contextual menu. Other static information about an object identifier 420 may include comments provided by other users of the object management service 210, the creator of the object identifier, etc.

A representation 423 may also be included in the object identifier. The representation may be any element that can be used to represent the object. For example, the representation may be a graphical representation of the object, an audio representation of an object, or any other representation of an object.

In addition to the object management service 210 providing static information 428, in some implementations, supplemental information 430 may also be associated with the object identifier 420. Supplemental information may be any form of information or action provided by a source of the representation, a source of the object, or any other external source. For example, the source of the object may provide information about the object while other external sources may provide actions relevant to the object. For example, if the object is a television, the source of the television may be the manufacturer, such as Sony, and that source may provide basic information about the object. In this example, the information about the object provided by the manufacturer may include the dimensions, resolution, weight, etc. Other external sources, such as sellers of the television, may provide additional supplemental information that may be associated with the object identifier 420. For example, sellers of the object may provide actions that allow a user viewing the object identifier 420 to initiate a purchase of the object, obtain additional information about the object, obtain information about the external source selling the object, etc.

Returning to FIG. 4, the object identifier 420 may also identify a source 434 from which the representation of the object was obtained, or the source of the object. For example, the source may be the website from which the contextual menu was invoked and the object represented by the object identifier retrieved. In addition to providing a source 434, if the object identifier was based upon and created from another existing object identifier, that existing object identifier may be identified in the object identifier 420 as the parent 436 of the object identifier 420. Likewise, the set(s) 432 with which the object associated may also be included in the object identifier 420. Finally, constraints 438 may also be associated with the object identifier 420 and used to control access, modification or other aspects of the object identifier 420. For example, the creator of an object identifier 420 may specify constraints as to whether the object identifier can be viewed by other users, copied into other sets, whether users can comment on the object identifier, etc.

Figure 5:
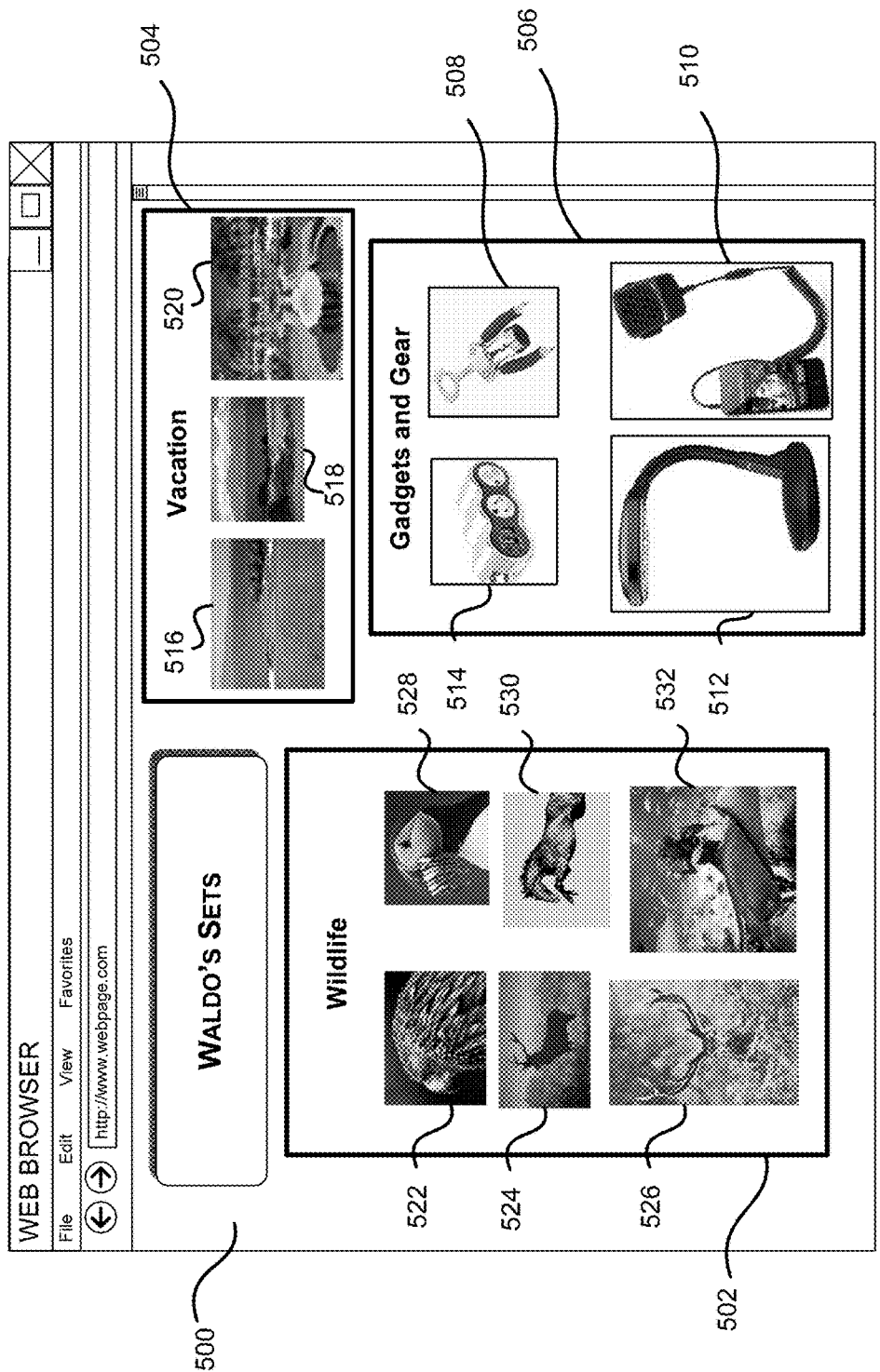
FIG. 5 is a block diagram of an example user interface for presenting object identifiers to a user, according to an implementation.

FIG. 5 is a block diagram of an example user interface 500 for presenting object identifiers to a user, according to an implementation. In the example user interface 500 the object identifiers have been arranged into sets—Wildlife 502, Vacation 504, and Gadgets and Gear 506. As discussed above, an object identifier 508, 510, 512, 514, 516, 518, 520, 522, 524, 526, 528, 530, 532 may represent any object and/or be the object itself. A user may view and interact with object identifiers, and/or organize object identifiers into sets 502, 504, 506, etc. In some implementations, a user may select an object identifier and invoke a contextual menu to take an action on the selected object identifier. For example, a user may touch the display and provide a long press to select the object identifier 522. Upon detecting the long press (invocation of the contextual menu), the contextual menu may be presented and the user may perform an action on the selected object identifier.

Figure 6:
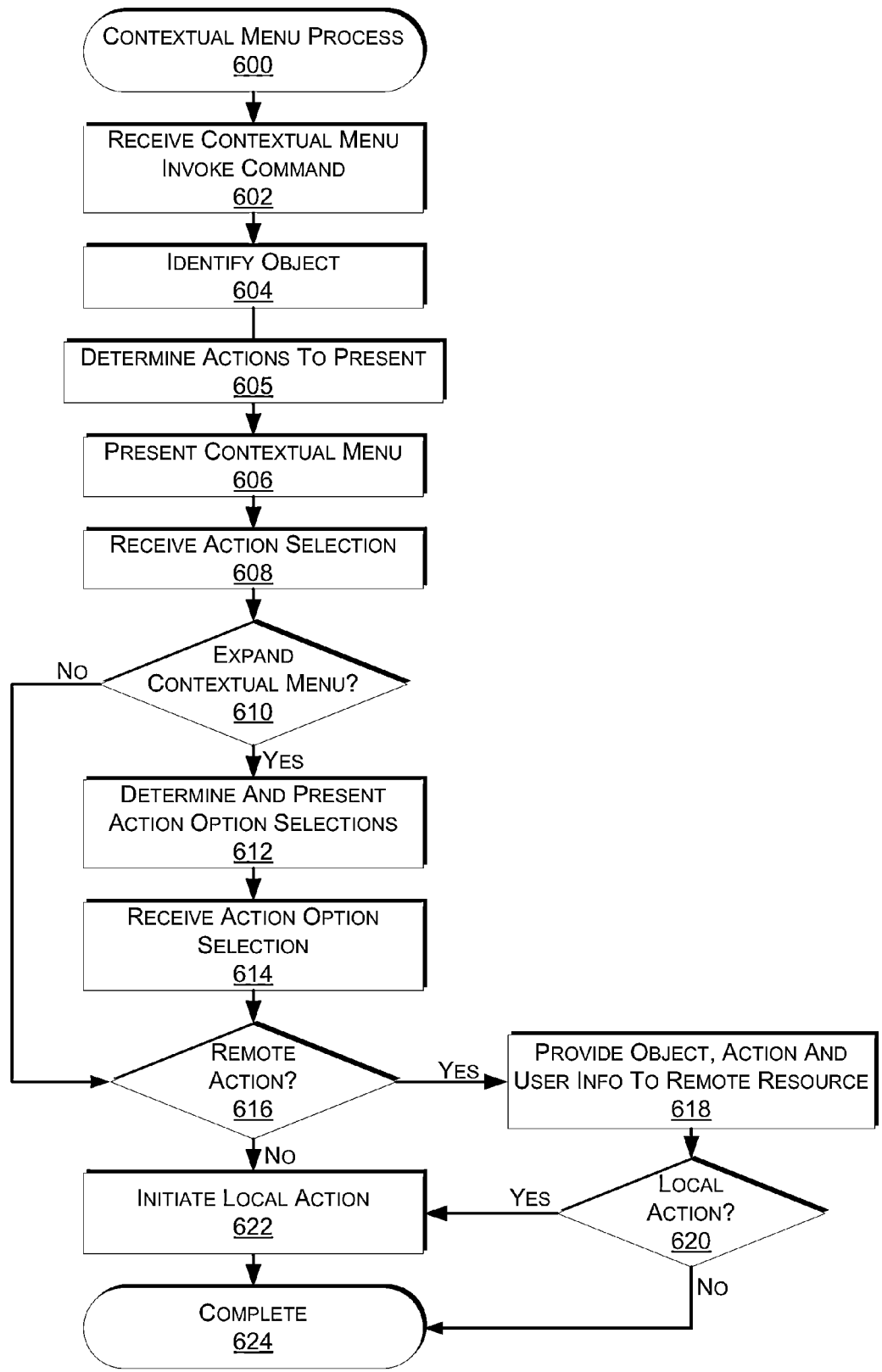
FIG. 6 illustrates an example contextual menu process, according to an implementation.

FIG. 6 illustrates an example contextual menu process 600, according to an implementation. The example process 600 and each of the other processes described herein are illustrated as a collection of blocks in a logical flow graph. Some of the blocks represent operations that can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, solid-state drives, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations, the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded or uploaded through the Internet or other networks. Finally, the order in which the operations are described is not intended to be construed as a limitation, and any number of the described operations can be combined in any order and/or in parallel to implement the process. Likewise, additional or fewer operations than those described may be utilized with the various implementations described herein.

The example process 600 begins upon receipt of a contextual menu invocation command, as in 602. As discussed above, an invocation command may be any defined input to invoke the contextual menu. For example, the contextual menu invocation command may be a long press, double-touch on a touch based display, selection of a contextual menu identifier, etc. Upon receiving a contextual menu invocation command, the object selected with the invocation command is determined, as in 604. For example, if the invocation command is a long press on a represented object, such as an image, the image is determined. If the invocation is a selection of a contextual menu identifier represented on the display of the client device, the object associated with the contextual menu identifier is determined.

Actions to be included in a contextual menu may also be determined, as in 605. For example, actions to be presented to the user may be determined based at least in part on one or more of an identity of the user, a prior action selected by the user, an object, a prior object selected by the user, and/or a relationship between the object and the user; etc.

In one example, a weighting function may be used to determine actions and corresponding action identifiers to present to the user with the contextual menu. The weighting function may consider past actions selected by a user and each action given a decaying weight value based on a time since the action was last performed. Likewise, for any actions performed by the user while on the same or similar presentation area of where the contextual menu is being invoked may be given additional weight. Each of the prior action weighting values may then be summed (the same actions performed at different times combined) and actions with the highest weighting values may be presented to the user as part of the contextual menu. In other implementations, the currently selected object may be processed (e.g., using image recognition algorithms) and compared with other objects previously selected by the user and actions performed on prior objects having a high similarity with the currently selected object may be given an additional weight.

Based on the determined actions, corresponding action identifiers are determined and a contextual menu is presented to the user that includes the determined action identifiers, as in 606. In some implementations, the contextual menu may also determine the location at which the contextual menu invocation command was received and/or an identification of the object selected for which the action will be performed. While the examples discussed herein describe visual presentation of the contextual menu, in some implementations, some or all of the contextual menu may be presented in other forms to the user. For example, the contextual menu may be presented audibly, through tactile feedback, or a combination thereof. In some implementations, the action identifiers and/or action option identifiers may be presented visually and audible information about each action identifier and/or action option identifier may be presented audibly. In some implementations, more or fewer action identifiers and/or action option identifiers may be included in the contextual menu. Likewise, in some implementations, a user may specify what actions are to be associated with presented action identifiers and/or what action options are to be associated with presented actions.

After presenting the action identifiers, one or more action selections may be received, as in 608. For example, the example process may receive an action selection from the user to email the object to another user. The action selection is received in response to the user selecting one or more of the presented action identifiers.

Upon receiving the action selection, a determination is made as to whether the contextual menu is to be expanded, as in 610. If the selected action has one or more corresponding action options, it may be determined that the contextual menu is to be expanded. For example, if the user has selected the action of posting the object to a social network, it may be determined that the contextual menu is to be expanded to present identifiers (action option identifiers) for different social networks (action options) to which the object may be posted. As another example, if the user has selected the action option of associating the object with a set maintained for the user by the object management service, and there are multiple sets maintained for the user, it may be determined to expand the contextual menu to enable selection of one of the sets by the user.

If it is determined that the contextual menu is to be expanded, action options corresponding to the selected action are determined and corresponding action option identifiers are presented to the user, as in 612. In some implementations, all action options corresponding to the selected action may be determined and presented to the user. In other implementations, only action option identifiers corresponding to action options likely to be selected by the user may be presented for selection. For example, the example process 600 may consider additional factors for each potential action option to determine a subset of action options that are likely to be selected by the user. Additional factors include, but are not limited to, the action option last selected by the user when performing the selected action, contextual information about each potential action option and/or the selected object, metadata about the selected object, object identifiers, other objects, etc. As an example, if the user has selected the action of adding the object to a set maintained for the user by the object management service, each set maintained by the object management service for the user may be considered and a subset selected for presentation as action options. In one implementation, the object management service may select as action options the set last used or accessed by the user, the set that has other associated objects that are determined to be similar to the selected object, and/or the set that has other associated objects having similar metadata. Similarity may be determined using a variety of techniques. For example, if the selected object is a digital image, the image may be processed using one or more algorithms, such as edge detection, object detection, facial detection, character recognition, feature detection, and the like, to generate features representative of the object. The generated features may be compared to features for other images associated with sets maintained for the user and an overall similarity score determined for each set. For example, if the set includes ten images, the features determined for the selected object may be compared to the features of each of the ten images of the set and an overall similarity score determined (e.g., an average of each similarity score). This may be done for each set maintained for the user and the set(s) with the highest similarity score selected as action options.

In one implementation, action options may be presented to the user in a manner similar to the presentation of actions. For example, when the user selects an action, action option identifiers for available action options may be presented to expand radially around the location of the selected action identifier that is presented to the user, as illustrated in FIG. 1B. In other implementations, the action option identifiers may be presented in a list form, or other configuration.

After presenting action option identifiers, the example process 600 receives an action option selection, as in 614. For example, the user may move their finger (or other input device) from the location of the selected action identifier to one of the presented action option identifiers to select the corresponding action option. In some implementations, the selected action option may be a selection of the action. For example, rather than selecting a presented action option, the user may initiate the action by, for example, removing their finger from the display while their finger is positioned over the selected action.

Returning to decision block 610, some actions may not result in the contextual menu being expanded. For example, if the selected action only has one potential action option, the action option may be performed and the contextual menu not expanded. For example, if the selected action is to download the selected object, the action of downloading may be automatically performed.

If it is determined at decision block 610 that the contextual menu is not to be expanded in response to receiving an action selection or upon receiving an action option selection at block 614, a determination is made as to whether the selected action or selected action option is a locally performed action or action option or one that is performed remote from the client device, as in 616. If it is determined that the action or action option is a remote action, action information that includes the selected object, action commands and user information are provided to a remote computing resource, such as an object management service, as in 618. In other implementations, the action information may include fewer, additional, and/or different items of information. Generally, the action information includes the information necessary for the remote computing resource to perform the selected action and/or the selected action option.

In addition to providing action information to the remote computing resources, a determination may also be made as to whether a local action and/or action option is to be performed, as in 620. In some implementations, an action identifier and/or action option identifier may represent multiple actions and/or action options, all of which may be performed upon selection of the action identifier and/or action option identifier. The multiple actions and/or action options may all be locally performed, performed remotely, or a combination of both locally and remotely performed. For example, an action identifier may represent actions of emailing the selected object to another user (local action) and posting the object on a social networking site (remote action). Likewise, selection of an action that results in the expansion of the contextual menu to allow selection of action options may also result in an action being performed. For example, if the selected action is to post the selected object to a social network, the contextual menu may expand to allow selection of a social network from potential social networks (action options). In addition, the selected object may be automatically associated with a set maintained for the user that includes objects that the user has posted to social networks.

If it is determined that the selected action identifier and/or selected action option represents a locally performed action and/or action option at either decision block 616 or decision block 620, performance of the local action and/or action option is initiated on the client device, as in 622. Upon completion of the local action and/or action option, or if it is determined that no local action and/or action option is to be performed, the example process 600 completes, as in 624.

Figure 7:
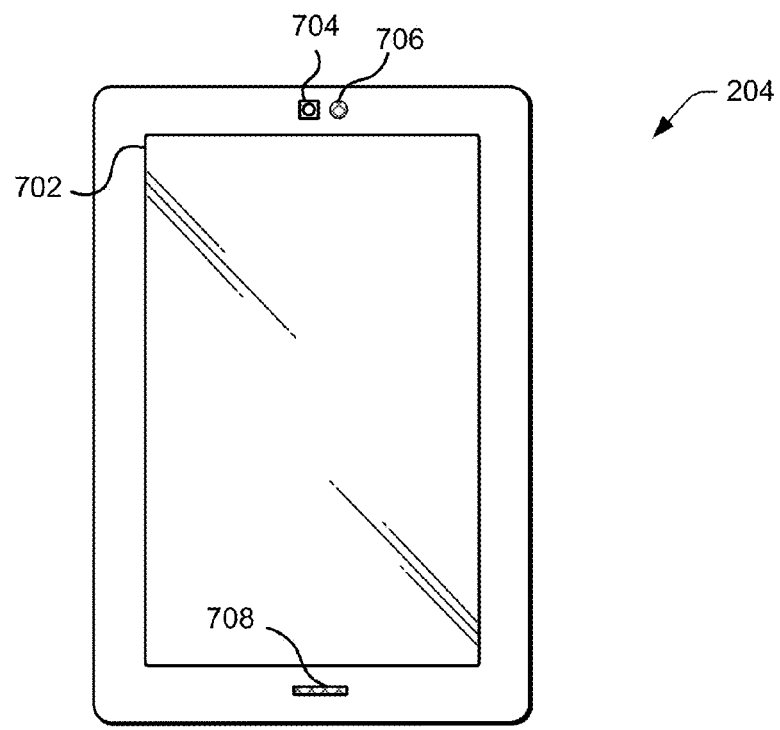
FIG. 7 illustrates an example computing device that can be used in accordance with various implementations.

FIG. 7 illustrates an example client device 204 that can be used in accordance with various implementations described herein. In this example, the client device 204 includes a display 702 and optionally at least one input component 704, such as a camera, on a same side of the device as the display 702. The client device 204 may also include an audio transducer, such as a speaker 706, and optionally a microphone 708. Generally, the client device 204 may have any form of input/output components that allow a user to interact with the client device 204. For example, the various input components for enabling user interaction with the device may include a touch-based display 702 (e.g., resistive, capacitive, Interpolating Force-Sensitive Resistance (IFSR)), camera (for gesture tracking, etc.), microphone, global positioning system (GPS), compass or any combination thereof. One or more of these input components may be included on a device or otherwise in communication with the device. Various other input components and combinations of input components can be used as well within the scope of the various implementations as should be apparent in light of the teachings and suggestions contained herein.

Figure 8:
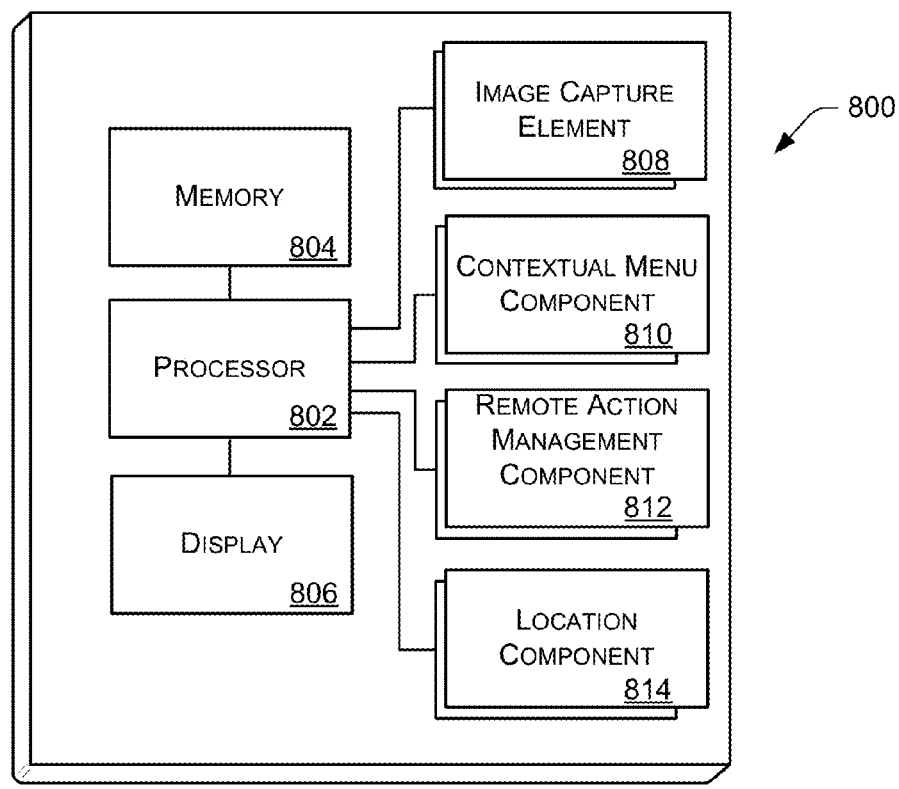
FIG. 8 illustrates an example configuration of components of a computing device, such as that illustrated in FIG. 7.

In order to provide the various functionality described herein, FIG. 8 illustrates an example set of basic components 800 of a client device 204, such as the client device 204 described with respect to FIG. 7 and discussed herein. In this example, the device includes at least one central processor 802 for executing instructions that can be stored in at least one memory device or element 804. As would be apparent to one of ordinary skill in the art, the device can include many types of memory, data storage or computer-readable storage media, such as a first data storage for program instruction for execution by the processor 802. Removable storage memory can be available for sharing information with other devices, etc. The device typically will include some type of display 806, such as a touch-based display, electronic ink (e-ink), organic light emitting diode (OLED) or liquid crystal display (LCD).

As discussed, the device in many implementations will include at least one image capture element 808, such as one or more cameras that are able to image objects in the vicinity of the device. An image capture element can include, or be based at least in part upon, any appropriate technology, such as a CCD or CMOS image capture element having a determined resolution, focal range, viewable area, and capture rate. The device can include at least one contextual menu component 810 for performing the contextual menu process discussed above with respect to FIG. 6. The client device may be in constant or intermittent communication with the object management service 210 and may exchange information, such as action information, representations, descriptions, source information, etc., with the object management service 210 as part of the contextual menu process.

The device may also include a remote action management component 812 that stores and manages information for initiating remote actions. Storing and maintaining such information on the device provides the ability for a user to select actions that are to be performed remotely even in the event the client device cannot communicate with the object management service 210. When communication is restored, the action information is delivered to the object management service 210 and the requested action performed.

The device also can include at least one location component 814, such as GPS, NFC location tracking or Wi-Fi location monitoring. Location information obtained by the location component 814 may be used with the various implementations discussed herein to identify the location of the user, source location, object location, and the like and support the creation, modification and/or management of sets and/or object identifiers.

The example client device may also include at least one additional input device able to receive conventional input from a user. This conventional input can include, for example, a push button, touch pad, touch-based display, wheel, joystick, keyboard, mouse, trackball, keypad or any other such device or element whereby a user can input a command to the device, such as a contextual menu invocation command. These I/O devices could be connected by a wireless, infrared, Bluetooth, or other link as well in some implementations. In some implementations, however, such a device might not include any buttons at all and might be controlled only through touch (e.g., touch-based display), audio (e.g., spoken) commands, or a combination thereof.

Figure 9:
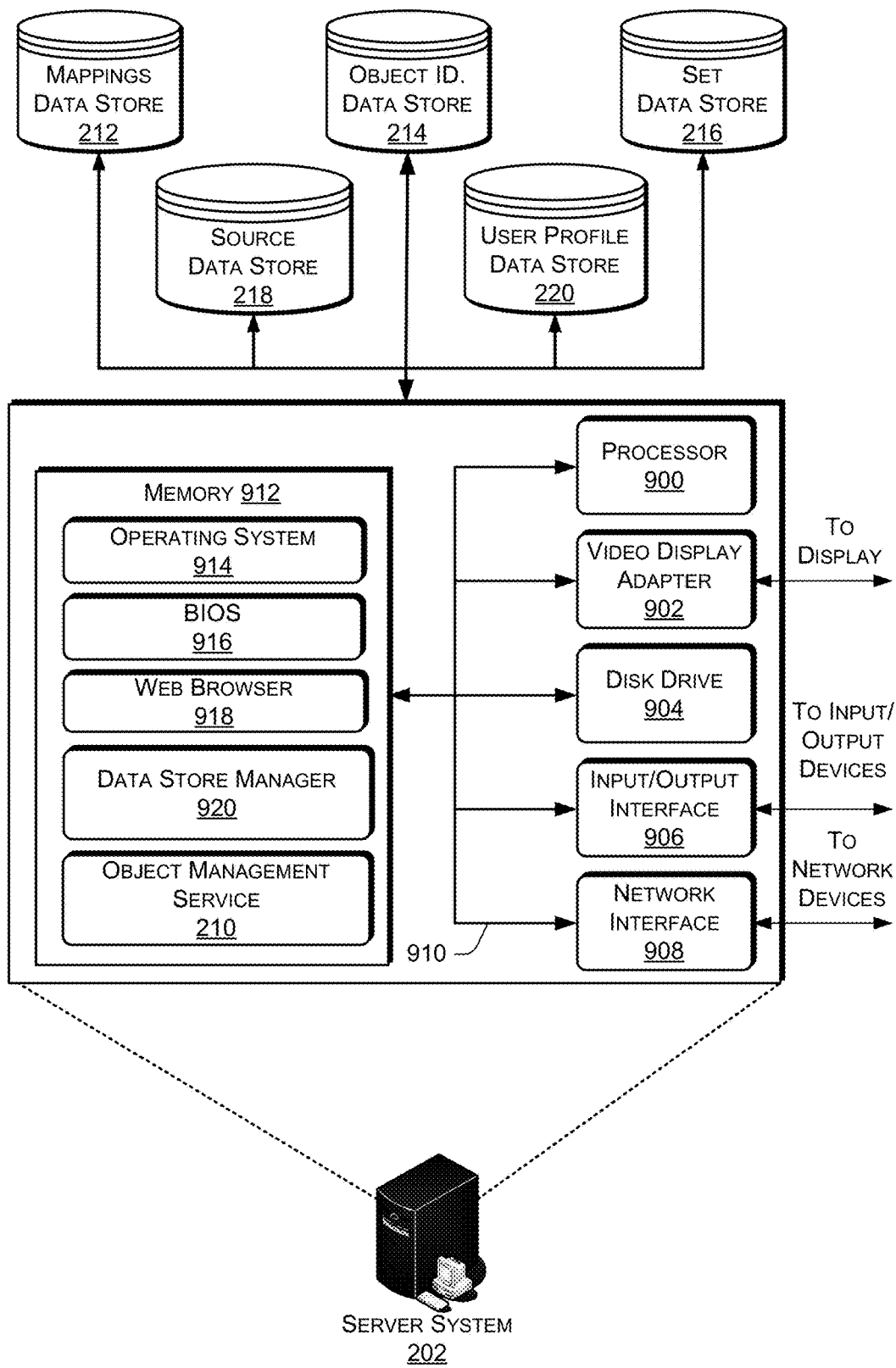
FIG. 9 is a pictorial diagram of an illustrative implementation of a server system that may be used for various implementations.

FIG. 9 is a pictorial diagram of an illustrative implementation of a server system, such as the server system 202, that may be used in the environment of FIG. 2. The server system 202 may include a processor 900, such as one or more redundant processors, a video display adapter 902, a disk drive 904, an input/output interface 906, a network interface 908, and a memory 912. The processor 900, the video display adapter 902, the disk drive 904, the input/output interface 906, the network interface 908, and the memory 912 may be communicatively coupled to each other by a communication bus 910.

The video display adapter 902 provides display signals to a local display (not shown in FIG. 9) permitting an operator of the server system 202 to monitor and configure operation of the server system 202. The input/output interface 906 likewise communicates with external input/output devices not shown in FIG. 9, such as a mouse, keyboard, scanner, or other input and output devices that can be operated by an operator of the server system 202. The network interface 908 includes hardware, software, or any combination thereof, to communicate with other computing devices. For example, the network interface 908 may be configured to provide communications between the server system 202 and other computing devices, such as the client device 204, via the network 208, as shown in FIG. 2.

The memory 912 generally comprises random access memory (RAM), read-only memory (ROM), flash memory, and/or other volatile or permanent memory. The memory 912 is shown storing an operating system 914 for controlling the operation of the server system 202. A binary input/output system (BIOS) 916 for controlling the low-level operation of the server system 202 is also stored in the memory 912.

The memory 912 additionally stores program code and data for providing network services that allow client devices 204 and external sources 206 to exchange information and data files with the server system 202 and/or the object management service 210. Accordingly, the memory 912 may store a browser application 918. The browser application 918 comprises computer executable instructions, that, when executed by the processor 900, generate or otherwise obtain configurable markup documents such as Web pages. The browser application 918 communicates with a data store manager application 920 to facilitate data exchange and mapping between the mappings data store 212, the object identifier data store 214, the set data store 216, the source data store 218 and/or the user profile data store 220, client devices, such as the client device 204 shown in FIG. 2, and/or external sources, such as the external sources 206 shown in FIG. 2.

As used herein, the term "data store" refers to any device or combination of devices capable of storing, accessing and retrieving data, which may include any combination and number of data servers, databases, data storage devices and data storage media, in any standard, distributed or clustered environment. The server system 202 can include any appropriate hardware and software for integrating with the data stores 212-220 as needed to execute aspects of one or more applications for the client device 204, the external sources 206 and/or the object management service 210. The server system 202 provides access control services in cooperation with the data stores 212-220 and is able to generate content such as text, graphics, audio, video and/or object identifier or set related information (e.g., representations, context, descriptions, mappings, analytics about user interfaces) to be transferred to the client device 204 or external sources 206.

The data stores 212-220 can include several separate data tables, databases or other data storage mechanisms and media for storing data relating to a particular aspect. For example, the data stores 212-220 illustrated include mechanisms for storing content, user information, mappings and external source information, representations, which can be used to generate and deliver content to client devices 204 and/or external sources 206 (e.g., sets, object identifiers, representations) and control actions to be performed.

It should be understood that there can be many other aspects that may be stored in the data stores 212-220, such as access rights information, which can be stored in any of the above listed mechanisms as appropriate or in additional mechanisms of any of the data stores 212-220. The data stores 212-220 are operable, through logic associated therewith, to receive instructions from the server system 202 and obtain, update or otherwise process data in response thereto. For example, a client device may submit action information to create an object identifier from a selected object.

The memory 912 may also include the object management service 210, discussed above. The object management service 210 may be executable by the processor 900 to implement one or more of the functions of the server system 202. In one implementation, the object management service 210 may represent instructions embodied in one or more software programs stored in the memory 912. In another implementation, the object management service 210 can represent hardware, software instructions, or a combination thereof.

The server system 202, in one implementation, is a distributed environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction in FIG. 9 should be taken as being illustrative in nature and not limiting to the scope of the disclosure.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method, comprising:
under control of one or more computing systems configured with executable instructions,
maintaining multiple sets of information for a user of an electronic device, wherein each set of information of the multiple sets of information includes images associated with objects;
receiving a long press input at a location on a display of the electronic device to invoke a contextual menu;
selecting an object corresponding to the location, wherein the selected object includes an image;
determining a plurality of actions that may be performed with respect to the selected object;
causing presentation, on the electronic device, of the contextual menu, wherein the contextual menu includes a plurality of action identifiers, each of the plurality of action identifiers representative of a respective one of the plurality of actions;
receiving a selection of an action identifier from the plurality of action identifiers, wherein the action identifier is representative of an action to add the selected object to a set;
processing the image of the selected object to generate features representative of the selected object; and
for each set of at least a portion of the multiple sets of information,
comparing the generated features representative of the selected object to features for each image associated with the set to generate a similarity score for each image of the set, and
determining an overall similarity score for the set based on an average of the similarity scores for the images of the set;

including, in a plurality of action options corresponding to the selected action, an action option representative of a set with a highest overall similarity score;

causing presentation, on the electronic device, of a plurality of action option identifiers corresponding to the plurality of action options;

receiving a selection of an action option identifier from the plurality of action option identifiers; and in response to the selection of the action option identifier, causing performance of the action represented by the selected action identifier and corresponding to the selected action option identifier.

2. The computer-implemented method of claim 1, further comprising:
determining that the selected action identifier represents a remote action; and
sending action information to a remote computing resource.

3. The computer-implemented method of claim 2, wherein the action information includes one or more of the selected object, action commands, or user information.

4. The computer-implemented method of claim 1, further comprising:
sending action information to a remote computing resource, the action information indicating an action command corresponding to the action identifier and the selected object.

5. The computer-implemented method of claim 1, wherein the action identifier represents sending a message that includes the selected object; and
the computer-implemented method further comprising:
sending action information to a remote computing resource, the action information indicating an action command corresponding to the selected action option identifier.

6. The computer-implemented method of claim 1, wherein the image associated with the selected object is processed to generate features representative of the selected object subsequent to the contextual menu being presented to the user.

7. The computer-implemented method of claim 1, wherein the overall similarity score for each set of the at least a portion of the multiple sets of information is further based at least in part on comparing metadata associated with the selected object with metadata associated with the images associated with the respective set of information.

8. The computer-implemented method of claim 1, wherein the images are associated with the multiple sets of information.

9. The computer-implemented method of claim 1, wherein presenting the contextual menu to the user includes causing presentation, on the electronic device, an input identifier that identifies the location of the received input with the action identifiers each being displayed a defined distance from the input identifier in a radial pattern around the input identifier.

10. A computing system, comprising:
one or more processors; and
a memory coupled to the one or more processors and storing program instructions that when executed by the one or more processors cause the one or more processors to at least:
maintain multiple sets of information for a user of an electronic device, wherein each set of information of the multiple sets of information includes images associated with objects;
receive from the electronic device of the user an input at a location on a display of the electronic device, the input to invoke a contextual menu;
select an object corresponding to the location, wherein the selected object includes an image;
determine a weighting value for each action of a plurality of actions at least in part by applying a decaying weight function to an amount of time since the respective action was previously performed by the user;
determine a plurality of similar objects by comparing features depicted in images of previously selected objects with at least one feature depicted in the image of the selected object;
identify past actions that were previously performed by the user on the plurality of similar objects;
determine a subset of the plurality of actions that may be performed with respect to the selected object based at least in part on the weighting values of the plurality of actions and the past actions that were previously performed on the similar objects;
cause presentation, on the electronic device, of the contextual menu, wherein the contextual menu includes a plurality of action identifiers, each of the plurality of action identifiers representative of a respective one of the subset of the plurality of actions;
receive a selection of an action identifier representative of an action from the plurality of action identifiers;
process the image of the selected object and compare features of the image to features of other images associated with the multiple sets of information maintained for the user to determine a plurality of action options corresponding to the action represented by the selected action identifier;
cause presentation, on the electronic device, of a plurality of action option identifiers corresponding to the plurality of action options;
receive a selection of an action option identifier from the plurality of action option identifiers; and
in response to the selection of the action option identifier, cause performance of the action that is representative of the selected action identifier and corresponding to the selected action option identifier.

11. The computing system of claim 10, wherein the program instructions that when executed by the one or more processors further cause the one or more processors to at least:
determine a first action option corresponding to the selected action, wherein the first action option has a first probability of selection;
determine a second action option corresponding to the selected action, wherein the second action option has a second probability of selection; and
wherein the plurality of action options includes the first action option and the second action option.

12. The computing system of claim 11, wherein the program instructions that when executed by the one or more processors further cause the one or more processors to at least:
send for display a menu identifier enabling selection of at least one of the first action option or the second action option.

13. The computing system of claim 10, wherein the program instructions that when executed by the one or more processors further cause the one or more processors to at least:

determine that the selected object is selected as part of the invocation of the contextual menu.

14. The computing system of claim 10, wherein the program instructions that when executed by the one or more processors further cause the one or more processors to at least:
   determine that the selected action identifier represents a remote action; and
   send action information to a remote computing resource, wherein the action information includes the selected object and an identification of the remote action.

15. A computer-implemented method comprising:
   under control of one or more computing systems configured with executable instructions,
      maintaining multiple sets of information for a user of an electronic device, wherein a set of information for the user includes images associated with objects;
      receiving an input at a location on a display of the electronic device, the input to invoke a contextual menu;
      selecting an object corresponding to the location, wherein the selected object includes an image;
      determining a weighting value for each action of a plurality of actions at least in part by applying a decaying weight function to an amount of time since the respective action was previously performed by the user;
      determine a plurality of similar objects by comparing features depicted in images of previously selected objects with at least one feature depicted in the image of the selected object;
      identify past actions that were previously performed by the user on the plurality of similar objects;
      determining a subset of the plurality of actions that may be performed with respect to the selected object based at least in part on the weighting values of the plurality of actions and the past actions that were previously performed on the similar objects;
      causing presentation, on the electronic device, of the contextual menu, wherein the contextual menu includes a plurality of action identifiers, each of the plurality of action identifiers representative of a respective one of the subset of the plurality of actions;
      receive a selection of an action identifier representative of an action from the plurality of action identifiers;
      processing the image of the selected object and comparing features of the image to features of other images associated with the multiple sets of information maintained for the user to determine a plurality of action options corresponding to the action represented by the selected action identifier;
      causing presentation, on the electronic device, of a plurality of action option identifiers corresponding to the plurality of action options;
      receiving a selection of an action option identifier of the plurality of action option identifiers; and
      in response to the selection of the action option identifier, causing performance of the action represented by the selected action identifier and corresponding to the selected action option identifier.

16. The computer-implemented method of claim 15, wherein the contextual menu includes:
   presenting an input identifier at an approximate location of the input received to invoke the contextual menu; and
   wherein plurality of action identifiers are presented in a radial pattern and at a first distance from the input identifier.

17. The computer-implemented method of claim 15, wherein the input is a long press of an input device on a touch-based display of the electronic device.

18. The computer-implemented method of claim 15, further comprising:
   determining the selected object based at least in part on a location of the input with respect to the display of the electronic device.

19. The computer-implemented method of claim 18, wherein the selected object corresponds to one of a plurality of objects presented on the display.

20. The computer-implemented method of claim 19, wherein the action is performed with respect to the selected object and not with respect to other objects of the plurality of objects.

* * * * *